(12) United States Patent
Komada et al.

(10) Patent No.: US 6,332,442 B1
(45) Date of Patent: Dec. 25, 2001

(54) INTAKE AIR DUCT

(75) Inventors: Minoru Komada, Yokkaichi; Kazuo Fujihara, Komaki; Yoshikazu Hirose, Haguri-gun; Takahiro Komori, Inazawa; Hitoshi Kino, Ichinomiya; Hidetoshi Ishihara, Nagoya, all of (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/633,068

(22) Filed: Aug. 4, 2000

Related U.S. Application Data

(63) Continuation-in-part of application No. 09/293,148, filed on Apr. 16, 1999.

(30) Foreign Application Priority Data

| Apr. 16, 1998 | (JP) | 10-106740 |
| Jun. 2, 1998 | (JP) | 10-153139 |
| Nov. 12, 1998 | (JP) | 10-321714 |
| Nov. 12, 1998 | (JP) | 10-321746 |
| Nov. 12, 1998 | (JP) | 10-321748 |
| Mar. 15, 1999 | (JP) | 11-68573 |
| Aug. 5, 1999 | (JP) | 11-222530 |
| Feb. 10, 2000 | (JP) | 12-32968 |

(51) Int. Cl.$^7$ ............... F02M 35/12; F01N 1/16
(52) U.S. Cl. ............... 123/184.55; 123/184.56
(58) Field of Search .......... 123/184.55, 184.56, 123/184.21, 569; 261/39 B; 137/207.5

(56) References Cited

U.S. PATENT DOCUMENTS

| 3,777,727 | * | 12/1973 | Kirchner et al. | 261/39 B |
| 4,125,102 | * | 11/1978 | Tanaka et al. | 123/139 AW |
| 4,237,837 | * | 12/1980 | Toda et al. | 123/569 |
| 4,274,368 | * | 6/1981 | Shaffer | 123/184.56 |
| 4,858,567 | * | 8/1989 | Knapp | 123/184.56 |
| 4,911,111 | * | 3/1990 | Matsunaga et al. | 123/184.56 |
| 5,803,111 | * | 9/1998 | Soszka | 137/207.5 |
| 6,073,601 | * | 6/2000 | Guichard et al. | 123/184.55 |

FOREIGN PATENT DOCUMENTS

| 64-22866 | 7/1987 | (JP) . |
| 3-43576 | 9/1989 | (JP) . |

* cited by examiner

Primary Examiner—Marguerite McMahon
(74) Attorney, Agent, or Firm—Pillsbury Winthrop LLP

(57) ABSTRACT

An intake air duct serves as a passage for supplying air to an engine, and includes a first intake air passage, a second intake air passage, an opening-and-closing valve, an interlocking member and a coiled spring. The opening-and-closing valve is disposed swingably in the second intake air passage so as to open and close the second intake air passage. The interlocking member is disposed outside the first intake air passage or the second intake air passage, and swings by interlocking with the swinging of the opening-and-closing valve. The coiled spring is disposed swingably outside the first intake air passage or the second intake air passage, and has a swinging end, which is brought into contact with a surface of the interlocking member. The swinging end slides on a surface of the interlocking member as the swinging of the interlocking member. The second intake air passage is opened by the opening-and-closing valve when a first urging force, which acts onto the coiled spring while the interlocking member swings so as to interlock with the opening-and-closing valve being swung in an opening direction by a negative pressure exerted in the second intake air passage, is larger than a second urging force, which is exerted by a spring elasticity of the coiled spring. The second intake air passage is closed when the first urging force is smaller than the second urging force.

7 Claims, 8 Drawing Sheets

INTAKE AIR DUCT

This is a continuation-in-part of application Ser. No. 09/293,148, filed on Apr. 16, 1999.

BACKGROUND OF THE INVENTION

1. Field of the Invention

The present invention relates to an intake air duct, which serves as a passage for supplying air to an engine. More particularly, it relates to an intake air duct, in which noises are reduced when taking air in.

2. Description of the Related Art

In an intake air system of an automobile engine, there arises a problem in that noises are generated at an intake air duct when taking air in. These intake air noises are irritating to ears particularly when the engines run at low revolving speeds. Hence, a side branch and/or a resonator have been disposed in the air duct conventionally, and the noises of specific frequencies, which are calculated based on the Helmholtz resonance theory, have been reduced.

However, a large branch extends as long as about 30 cm, and a resonator of a large volume enlarges as large as 14 liters. Therefore, such a noise absorption apparatus occupies a large space in the engine room. Accordingly, there may arise a drawback in that the degree of freedom decreases in boarding the other component members.

Hence, Japanese Unexamined Utility Model Publication (KOKAI) No. 64-22, 866 discloses an orifice disposed in the intake air duct. The intake air noises are reduced by throttling the intake air passage at the orifice. When the intake air passage is throttled in such a manner, the acoustic mass enlarges, and accordingly the intake air noises of low frequencies can be reduced.

Japanese Unexamined Utility Model Publication (KOKAI) No. 3-43,576 discloses an apparatus for reducing the intake air noises. The apparatus includes two intake air tubes which are connected to an air cleaner case parallelly, two branched tubes which are branched from the respective two intake air tubes respectively, a shared resonator to which the respective branched tubes are connected altogether, and an opening-and-closing valve, which is disposed on the upstream side of the connecting portion of the branched tube of one of the intake tubes, and which opens selectively depending on the running conditions.

By the apparatus disclosed in Japanese Unexamined Utility Model Publication (KOKAI) No. 3-43,576, the opening-and-closing valve is controlled so that the number of the intake air tubes are switched from one to two, or vice versa, depending on the revolving speeds of an engine. Thus, the inlet air amount is controlled depending on the revolving speeds of the engine, and accordingly the intake air noises can be reduced.

However, in the above-mentioned method in which the intake air passage is throttled, there may arise a problem in that the inlet air amount is insufficient at the high engine revolving speeds so that the engine output decreases.

In the apparatus disclosed in Japanese Unexamined Patent Publication (KOKAI) No. 3-43,576, the opening-and-closing valve may be held between the fully closed state and the fully opened state or between the fully opened state and the fully closed state. Thus, there may be a case where the intake air tube is closed on the midway for a long period of time. In this case, although the engine is operated at low revolving speeds, the intake air noises enlarge because the acoustic mass is s mall. Accordingly, there may be a problem in that booming noises of low frequencies are heard in a passenger compartment.

Moreover, Japanese Unexamined Patent Publication (KOKAI) No. 3-43,576 discloses to use an electronic control circuit, an electromagnetic opening-and-closing valve or a diaphragm actuator, etc., for actuating the opening-and-closing valve. When these component members are used, the number of the component members increases so that the valve complicates. Moreover, it is not preferred in view of the costs.

SUMMARY Of THE INVENTION

The present invention has been developed in view of the aforementioned circumstances. It is an object of the present invention to provide an intake air duct, which reduces the intake air noises at low engine revolving speeds, which can take in a sufficient amount of air at high engine revolving speeds, which inhibits the booming noises of low frequencies from generating, and which can be made with reduced costs without using the electronic control circuit and the electromagnetic valve, etc.

An intake air duct according to the present invention can achieve the aforementioned objects, and can serve as a passage for supplying air to an engine. The present intake air duct comprises:

a first intake air passage;

a second intake air passage;

an opening-and-closing valve disposed swingably in the second intake air passage so as to open and close the second intake air passage;

an interlocking member disposed outside the first intake air passage or the second intake air passage, and swinging by interlocking with the swinging of the opening-and-closing valve; and a coiled spring disposed swingably outside the first intake air passage or the second intake air passage, and having a swinging end brought into contact with a surface of the interlocking member, the swinging end sliding on a surface of the interlocking member as the swinging of the interlocking member;

opening the second intake air passage by the opening-and-closing valve when a first urging force, which acts onto the coiled spring while the interlocking member swings so as to interlock with the opening-and-closing valve being swung in an opening direction by a negative pressure exerted in the second intake air passage, is larger than a second urging force, which is exerted by a spring elasticity of the coiled spring; and closing the second intake air passage when the first urging force is smaller than the second urging force.

Namely, the present intake air duct can reduce the intake air noises of low frequencies at low engine revolving speeds, can take in a sufficient amount of air at high engine revolving speeds. Moreover, the present intake air duct can be made at reduced costs, because it is made without using the electronic control circuit, the electromagnetic opening-and-closing valve, the diaphragm actuator, etc.

In addition, even if water and dust may intrude into the intake air passage of the present intake air duct, and even if they deposit thereon, it is possible to inhibit the accuracy of the operations, which result from the deposited water and duct, from degrading, because the sliding portion is disposed outside the intake air passage.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and are not intended to limit the scope of the appended claims.

An intake air duct according to the present invention achieves the aforementioned objects. In the present intake air duct, when an opening-and-closing valve is swung by a negative pressure exerted in a second intake air passage, an interlocking member swings so as to interlock with the opening-and-closing valve. Whilst, a coiled spring is brought into contact with the interlocking member at its leading end, and urges the interlocking member so that the opening-and-closing valve swings in a direction closing the second intake air passage.

Figure 1:
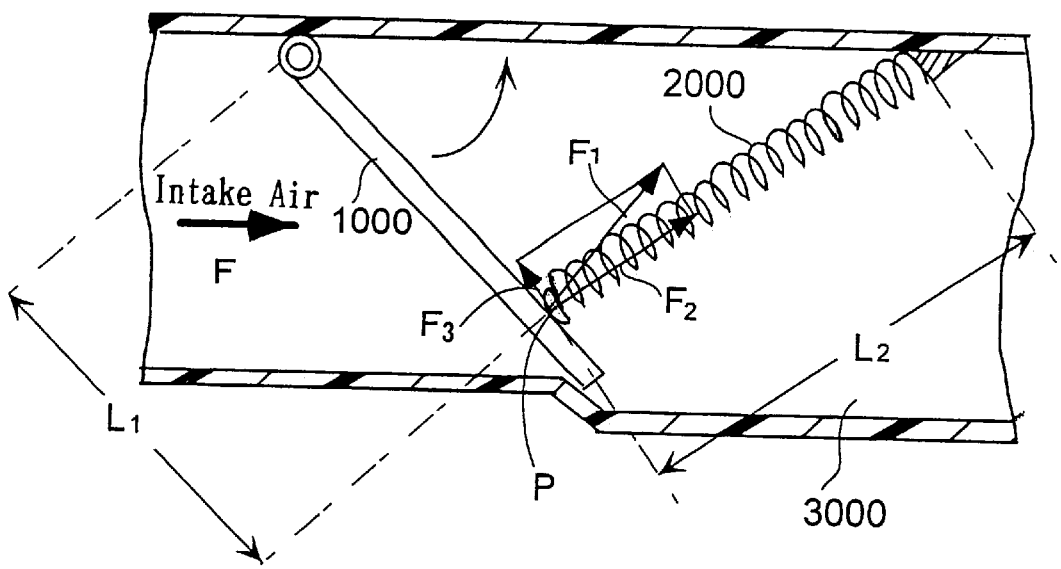
FIG. 1 is an explanatory diagram for illustrating the operations of an intake air duct according to the present invention.

This intake air duct is illustrated in FIG. 1 schematically. FIG. 1 illustrates a second intake air passage of an intake air duct, which has a first intake air passage and a second intake air passage.

In FIG. 1, an interlocking member is abbreviated in order to understand the present invention with ease. Accordingly, a coiled spring 2000 is illustrated so that it directly contacts with an opening-and-closing valve 1000. Even if the interlocking member is thus abbreviated, such an apparatus operates similarly effects the advantages of the present invention. However, since it is worried that the precision of the operations maybe degraded by water and dust, the present invention is constituted so that a coiled spring indirectly urges the opening-and-closing valve by way of the interlocking member.

Suppose that the leading end of the coiled spring 2000 contacts with the opening-and-closing valve 1000 at a point P, that the distance between the supporting point of the opening-and-closing valve 1000 and the point P is $L_1$, and that the distance between the fixed point of the coiled spring 2000 and the point P is $L_3$, a force $F_1$ resulting from the intake air negative pressure F is acted onto the opening-and-closing valve 1000. Accordingly, an upward rotation moment, $F_1 \times L_1$, acts onto the opening-and-closing valve 1000. The force $F_1$ is divided into component forces $F_2$ and $F_3$, and the component forces $F_2$ and $F_3$ act onto the coiled spring 2000. Consequently, an upward rotation moment, $F_3 \times L_3$ a (i.e., a first urging force), acts onto the coiled spring 2000 at the point P.

On the other hand, the coiled spring 2000 adversely presses the opening-and-closing valve 1000 in a direction opposite to $F_2$ by its own elastic force, and a downward rotation moment (i.e., a second urging force) acts onto the coiled spring 2000 at the point P. Hence, when the downward rotation moment (i.e., a second urging force) exerted by the coiled spring 2000 is larger than the upward rotation moment, $F_3 \times L_2$ (i.e., the first urging force), by the intake air negative pressure, the opening-and-closing valve 1000 is inhibited from swinging by the coiled spring 2000, thereby maintaining the closed state of the second intake air passage 3000. Thus, since air is taken in only through the first intake air passage having a minor diameter, the acoustic mass enlarges so that it is possible to reduce the intake air noises of low frequencies without using the resonator, etc.

Namely, until the intake air negative pressure F enlarges to a certain extent, the downward rotation moment, which acts at the point P by the coiled spring 2000, serves as a repulsion force, the swinging of the opening-and-closing valve 1000 is suppressed by the coiled spring 2000. Accordingly, it is possible to effectively inhibit the noises at the low engine revolving speeds, and to prevent the opening-and-closing valve 1000 from flapping.

Figure 2:
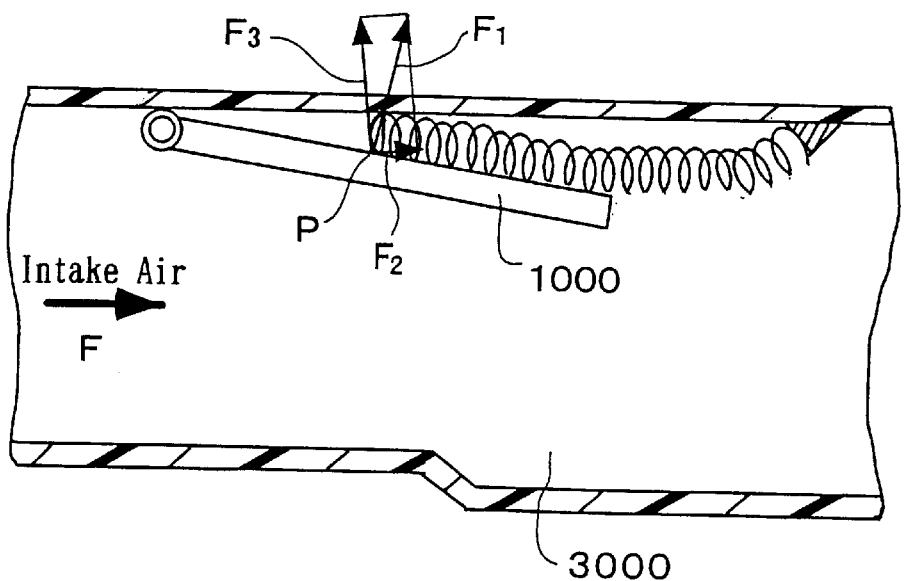
FIG. 2 is an explanatory diagram for illustrating the operations of the present intake air duct.

When the intake air negative pressure F enlarges so that the rotation moment (i.e., the first urging force), $F_3 \times L_2$, by the intake air negative pressure F is larger than the downward rotation moment (i.e., the second urging force) by the coiled spring 2000, the opening-and-closing valve 1000 swings so as to open the second intake air passage 3000 as illustrated in FIG. 2. At this moment, the component $F_3$ enlarges as the coiled spring 2000 swings. Consequently, the coiled spring 2000 deforms so that it is possible to swing the opening-and-closing valve 1000 to open the second intake air passage 3000.

Therefore, in accordance with the intake air duct according to the present invention, the intake air is taken in mainly through the second intake air passage 3000. Accordingly, it is possible to avoid the disadvantages, such as the reduction of the inlet air amount, etc. The intake air noises are lost in the engine noises, and cannot be the irritating noises.

In order to further improve the aforementioned operations, it is preferred that an opening area of the first intake air passage is reduced and an opening area of the second intake air passage is enlarged. Further, an intake duct can be made into a branched construction. For example, when an intake air duct has two intake air passages, e.g., a first intake air passage and a second intake air passage, and when the air passages are made into a passage by joining them on their ways, the present intake air duct can preferably be constituted in the following manner: namely; it is preferred that the intake air passage having the first intake air passage is narrowed so that the acoustic mass is further enlarged, and that the intake air passage having the second intake air passage is widened so that air is supplied in a sufficient amount.

Furthermore, it is possible to provide the present intake air duct with a side branch or a resonator. However, the present intake air duct can reduce the noises of the low frequencies without providing the side branch or the resonator. Therefore, in order to minimize the space occupied by the present intake air duct in the engine room so as to improve the degree of freedom in boarding the other component members, it is not preferable to provide the side branch or the resonator.

Suppose that a predetermined value $F_x$ of the negative pressure is exerted in the second intake air passage when the opening-and-closing valve closes the second intake air passage, and that a predetermined value $F_y$ of the negative pressure exerted in the second intake air passage when the opening-and-closing valve opens the second intake passage, the relationship of $F_x$ and $F_y$ is $F_x \leq F_y$. When the difference between the $F_x$ and the $F_y$ is small in opening the second intake air duct by the opening-and-closing valve, there may arise a case where the opening-and-closing valve flaps to generate the noises. When the difference between the $F_x$ and the $F_y$ is too large, there may arise a case where the intake air amount is insufficient. Accordingly, it is necessary to determine the values of the $F_x$ and the $F_y$, the urging force of the urging mean, etc., by tuning them deliberately.

By the way, there may arise a case where the air outside an automobile flows directly into an intake air duct to intrude into the intake air passage, and thereby the water and the dust may be deposited on the inner wall. If such is the case, the precision of the operations may be degraded by the foreign materials, which are deposited on the sliding portion, etc. Hence, in the present intake air duct, the interlocking member and the coiled spring are disposed outside the first intake air passage and the second intake air passage. Accordingly, the foreign materials are inhibited from depositing, and the accuracy of the operations is enhanced. Moreover, when a cover, which covers the interlocking member and the coiled spring, is disposed, it is possible to further inhibit the deposition of the foreign materials, and to further improve the reliability.

In the intake air duct according to the present invention, the coiled spring urges the opening-and-closing valve by way of the interlocking member. With this arrangement, it is unnecessary to prepare urging means as an independent component member. Thus, it is possible to reduce the number of the component members. Hence, the present intake air duct is less expensive. Since the adjustment of the second urging force can be done by adjusting the number of coils of the coiled spring and the coiling density, it is easy to carry out the tuning of the coiled spring.

At the opposite ends of the coiled spring, there are positioned the opposite ends of the wire rod. On one of the opposite end surfaces of the coiled spring and on the other radially opposite surface thereof, the numbers of turns of the wire rod are differentiated. Accordingly, the second urging force depends on the deforming directions of the coiled spring.

However, there may arise problems in that the man-hour requirement goes up if the coiled spring is assembled while checking the directions of the wire rod, and in that the quality is unstable because the assembly errors results in causing the fluctuation of the second urging force. Even when the coiled spring is assembled accurately, it is possible to consider that the coiled spring may be rotated about the central axis by vibrations, etc.

In order to prevent these problems, it is possible to think of forming the opposite end surfaces as an anomalous shape, and of forming the fitting seats of the coiled spring as a shape, which engages with the opposite end surfaces of the coiled spring. For example, when the opposite end surfaces of the coiled spring are formed as an ellipse shape, etc., it is possible to inhibit the coiled spring from rotating by the engagement between the opposite end surfaces of the coiled spring with the ellipse-shaped fitting seats. However, the ellipse-shaped coiled fitting is not practical. It is difficult to obtain the ellipse-shaped coiled springs of high accuracy, and it is expensive in terms of costs.

For instance, it may be possible to form an engagement portion, such as a projection, a concaved portion, etc., which engages with the opposite end surfaces of the wire rod of the opposite end surfaces of the coiled spring, on the fitting seat. However, if such is the case, and if an ordinary coiled spring is used, it may be possible to inhibit the coiled spring from rotating in a direction in which the opposite end surfaces of the wire rod engages with the engagement portion. However, it is impossible to inhibit the coiled spring from inversely rotating in the opposite direction.

Hence, in the intake air duct according to the present invention, it is preferred that one of the opposite ends of the wire rod of one of the opposite ends of the coiled spring is bent down in a radial direction so that the end of the wire rod is engaged with and held by the outer first intake air passage or second intake air passage. With this arrangement, it is possible to securely inhibit the coiled spring from rotating. Moreover, it is possible to carry out the positioning of the coiled spring with ease.

For example, the end of the wire rod of the end of the coiled spring can be bent down in a radial direction so that the end of the wire rod can be positioned in a diametric direction of the end surface of the coiled spring, and a groove can be formed in the fitting seat so that the end of the wire rod can engage therewith. With this arrangement, it is possible to easily and securely position the coiled spring by engaging the end of the wire rod with the groove, and to stably obtain the second urging force. Moreover, it is possible to inhibit the coiled spring from rotating.

Since the leading end of the coiled spring and the interlocking member slide with each other, it is preferred that a sliding portion of a small friction resistance is formed on one of the surfaces at least. For instance, in the case of the sliding between a metal and a plastic, the sliding portion can be prepared by forming a coating layer, which includes POM, polyamide, polyacetal, or the like, on a surface of member, which includes a metal, at least. It is possible to use a plastic containing a sliding agent, or to coat known lubricants to make the sliding portion. Moreover, it is possible to constitute the sliding member, such as bearings, rollers, etc.

It is preferred that the leading end of the coiled spring slides on the interlocking member in a predetermined direction only. Hence, it is preferred that a guide groove is formed in a surface the interlocking member so that the leading end of the coiled spring is guided by the guide groove. Namely, since the coiled spring itself can be deformed in different directions within the range of 360 deg., there may be a large possibility that the coiled spring operates unstably. Hence, when a slider is held at the leading end of the coiled spring, and when the slider slides in the guide groove, it is possible to arrange the coiled spring so as to deform in a predetermined direction only. Thus, the coiled spring operates stably.

However, in a case where the slider is fitted into and held in the coiled spring, the slider itself may rotate. Moreover, even when the coiled spring is fixed at one of the opposite ends, the coiled spring itself can rotate to a certain extent at the other opposite end.

Accordingly, when such a rotation occurs, there may arise a possibility that the slider and the guide groove interfere with each other so that the resistance fluctuates, and that the coiled spring operates unstably.

Hence, it is preferred that a semi-sphere-shaped slider is held at the leading end of the coiled spring, and that the leading end of the slider slides in the guide groove. With this arrangement, even if the slider tries to rotate, the contacting area between the slider and the guide groove can be constant substantially. Thus, since the interference is avoided, the coiled spring operates stably and the performance is inhibited from fluctuating.

However, when the intake air negative pressure increases to swing the opening-and-closing valve, the opening-and-closing valve may swing slowly at the beginning as the engine revolving speed increases, and then may swing at a breath so as to be the fully opened state. In this case, however, the opening-and-closing valve is put into a slightly opened state for a brief period of time, and accordingly there may arise a drawback in that the intake air noises leak from a space.

Hence, in the intake air duct according to the present invention, it is preferred that the second intake air passage has a guide surface provided with a surface, which is substantially parallel to a movement locus of a swinging end surface of the opening-and-closing valve. With this arrangement, even when the opening-and-closing valve swings slowly at the beginning as the engine revolving speed increases, the swinging end surface of the opening-and-closing valve moves in proximity to the guide surface. Accordingly, it is possible to inhibit the space between the opening-and-closing valve and the second intake air passage from arising, and to prevent the intake air noises from leaking through the space.

In the intake air duct according to the present invention, there may arise a drawback in that abnormal noises arise because the opening-and- closing valve vibrates when the opening-and-closing valve opens the second intake air passage slightly. This drawback results from the following phenomena. The intake air passes suddenly through the space having a small cross-sectional area between the opening-and-closing valve and the second intake air passage. When the difference between the first urging force and the second urging force is small, the opening-and-closing valve is put into the state for a long period of time. Accordingly, it may be likely to convey the intake air pulsation from the body of the engine to the opening-and-closing valve. Thus, the opening-and-closing valve may vibrate.

Hence, it is preferred that the second intake air passage is provided with an engagement surface, which contacts with the opening-and-closing valve when the opening-and-closing valve closes the second intake air passage, and that resisting means for giving a resisting force to the opening-and-closing valve when the opening-and-closing valve separates from the engagement surface. With this arrangement, when the intake air negative pressure increases, and when the difference between the second urging force, exerted by the elasticity of the coiled spring, and the first urging force increases so that the opening-and-closing valve tries to swing in the direction opening the second intake air passage, the resistance force, exerted by the resisting means, acts onto the opening-and-closing valve. Accordingly, the opening-and-closing valve maintains to close the second intake air passage until the difference force exceeds the resistance force, which is exerted by the resisting means. Then, when the difference force exceeds the resistance force, the opening-and-closing valve swings at a stroke to open the second intake air passage. Consequently, according to this present intake air duct, it is possible to sharply reduce the period, in which the small cross-sectional space is formed between the opening-and-closing valve and the second intake air passage, and accordingly it is also possible to inhibit the abnormal noises, which result from the vibrations of the opening-and-closing valve.

As for this resisting means, it is possible to use means for adsorbing the opening-and-closing valve, such as permanent magnets, electromagnets, etc., and urging means, such as springs, dampers, the dead weight of the opening-and-closing valve, etc. Moreover, it is preferable to use the coiled spring itself as the resisting means by optimizing the second urging force.

Note that it is possible to select the material of the coiled spring from the group consisting of, to start with, spring steel wires, hard steel wires, piano wires, oil-tempered wires, stainless steel wires, brass wires, nickel silver wires, phosphor bronze wires, beryllium wires, inconel wires, etc.

Hereinafter, the present invention will be described in detail with reference to examples and a comparative example.

COMPARATIVE EXAMPLE

Figure 13:
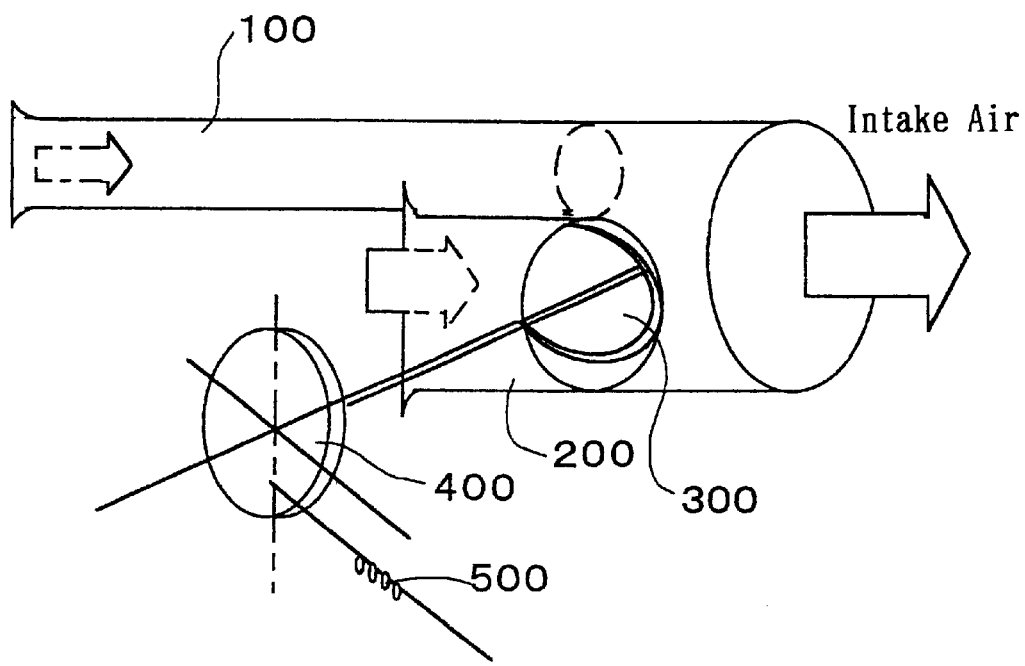
FIG. 13 is an explanatory diagram for illustrating an arrangement of a Comparative Example of an intake air duct.

FIG. 13 illustrates a Comparative Example of an intake air duct. This intake air duct corresponds to the one which is disclosed in Japanese Unexamined Utility Model Publication (KOKAI) No. 3-43,576, and is provided with a first intake air passage 100 of a minor diameter and a second intake air passage 200 of a major diameter. Further, a valve 300 is held swingably in the second intake air passage 200. Furthermore, a holding shaft of a valve 300 is connected with the center of a disk-shared cam 400. Moreover, on a peripheral portion of the cam 400, there is disposed a spring 500 in which one of the opposite ends is fixed, and in which the other one of the opposite ends is fixed to the cam 400. The spring 500 is arranged so that it exerts the smallest urging force when the valve 300 fully closes the second intake air passage 200.

In this intake air duct, when the intake air negative pressure in the second intake air passage 200 is smaller than a predetermined value, the valve 300 fully closes the second intake air passage 200. Accordingly, the intake air noises of low frequencies, which were taken in through a first intake air passage 100 only, are reduced. Then, when the intake air negative pressure exceeds a predetermined value, the valve 300 swings against the urging force of the spring 500, which is transmitted by way of the cam 400. Accordingly, the opening area of the second intake air passage 200 enlarges in proportion to the intake air negative pressure. Thus, the amount of air is secured sufficiently.

However, in the intake air duct of this Comparative Example, the valve 300 is held in the middle of the operation in a moment in which the valve 300 is put from the fully closed state into the fully opened state, or in which the valve 300 is put from the fully opened state into the fully closed state. Thus, the time period may enlarge in which there may be a space between the second intake air passage 200 and the valve 300. Accordingly, there may arise a disadvantage in that the booming noises of low frequencies may be heard in a passenger compartment room, because the intake air may leak through the space.

Example No. 1

Figure 3:
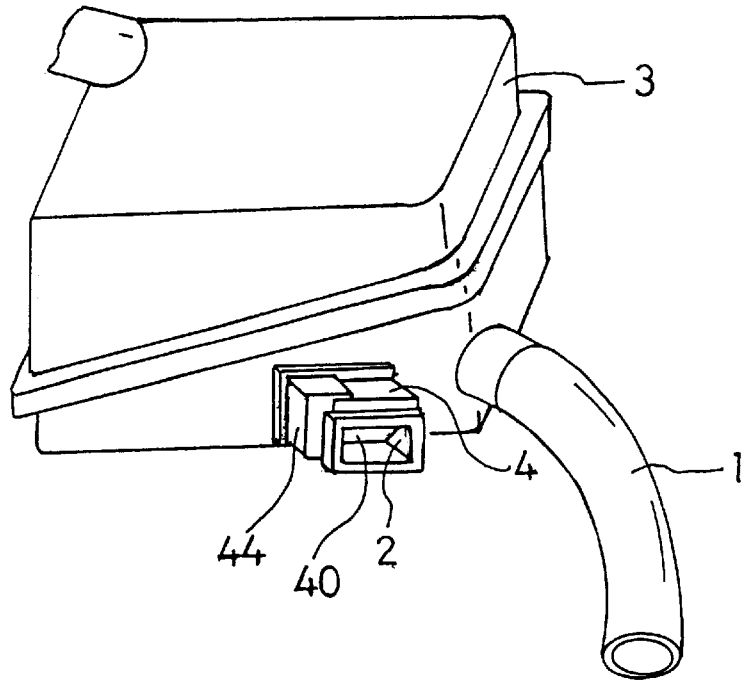
FIG. 3 is a perspective view for illustrating an overall arrangement of Example No. 1 of an intake air duct according to the present invention.

FIG. 3 illustrates Example No. 1 of an intake air duct according to the present invention. This intake air duct is connected to an air cleaner case 3 by a first intake air passage 1 having a minor diameter and a long length, and by a second intake air passage 2 having a larger diameter than that of the first intake air passage 1 and a short length.

The cross-sectional area of the first intake air passage 1 is arranged so that it is equal to the cross-sectional area of a Ø40 mm pipe, and the cross-sectional area of the second intake air passage 2 is arranged so that it is equal to the cross-sectional area of a Ø70 mm pipe. Moreover, a control unit 4 is formed adjacent to the inlet opening of the second intake air passage 2.

Figure 4:
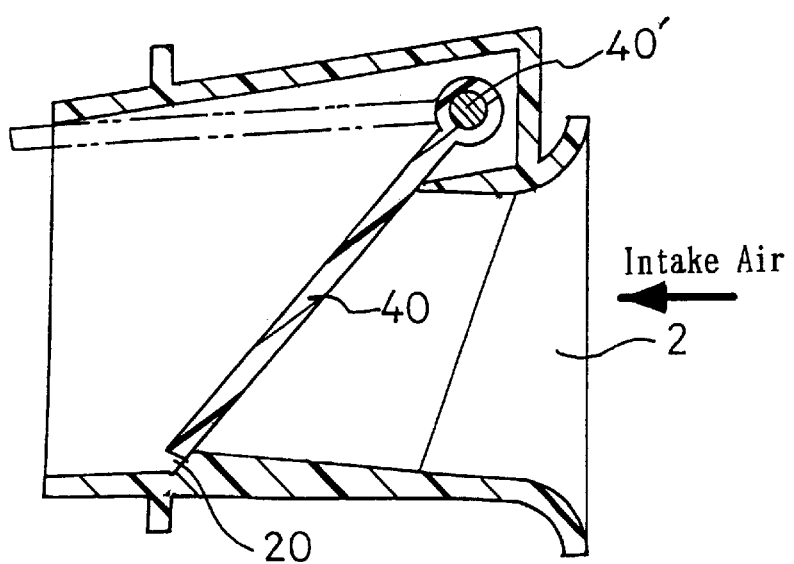
FIG. 4 is a major cross-sectional view for illustrating Example No. 1 of the present intake air duct when its valve is closed.

FIG. 4 illustrates the cross-sectional view of the control unit 4. As illustrated in the drawing, in the control unit 4, a valve 40 is held swingably by a supporting shaft 40'. Moreover, on an inner wall surface of the second intake air passage 2, there is formed a step 20, which is brought into contact with one of the opposite swinging ends of the valve 40.

Figure 5:
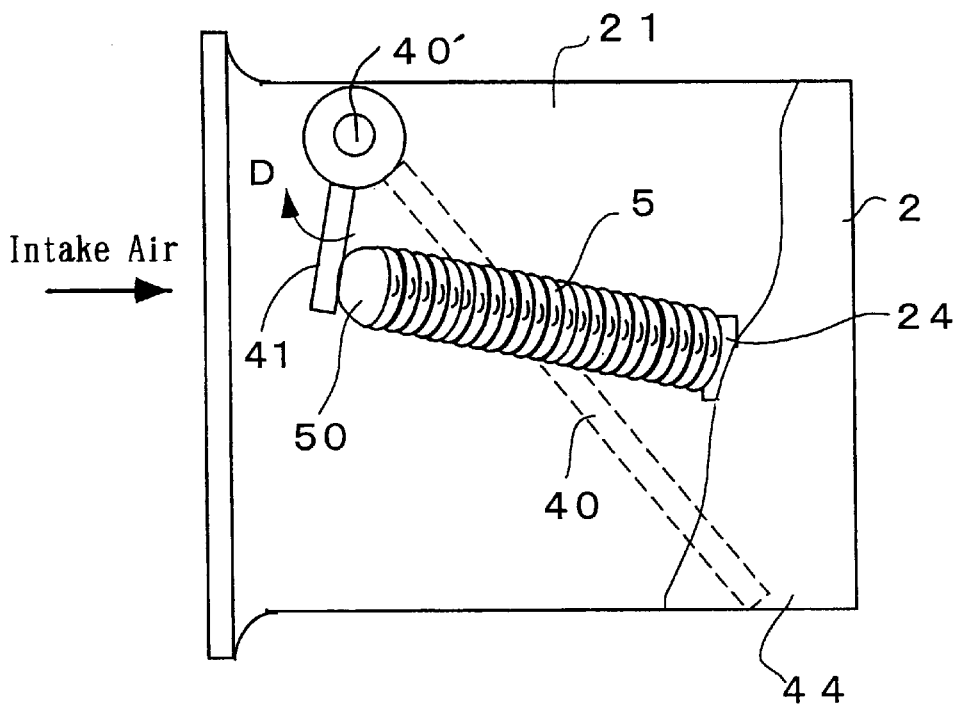
FIG. 5 is a major side view for illustrating Example No. 1 of the present intake air duct whose parts are taken off and whose valve is closed.
Figure 6:
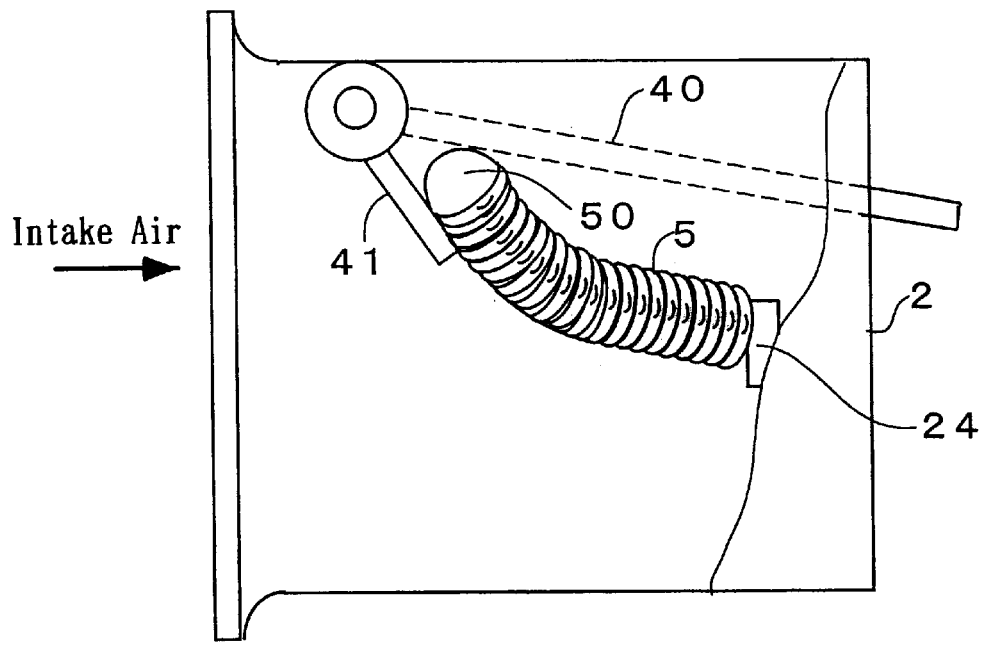
FIG. 6 is a major side view for illustrating Example No. 1 of the present intake air duct whose parts are taken off and whose valve is opened.
Figure 7:
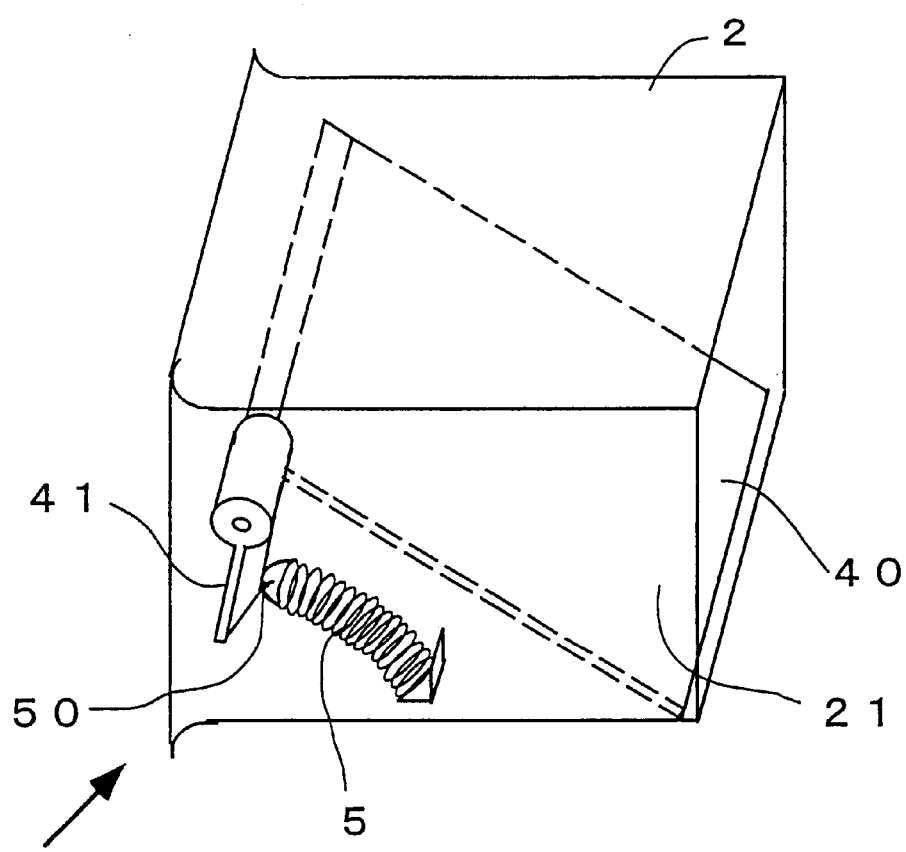
FIG. 7 is a perspective view for illustrating Example No. 1 of the present intake air duct.
Figure 7:
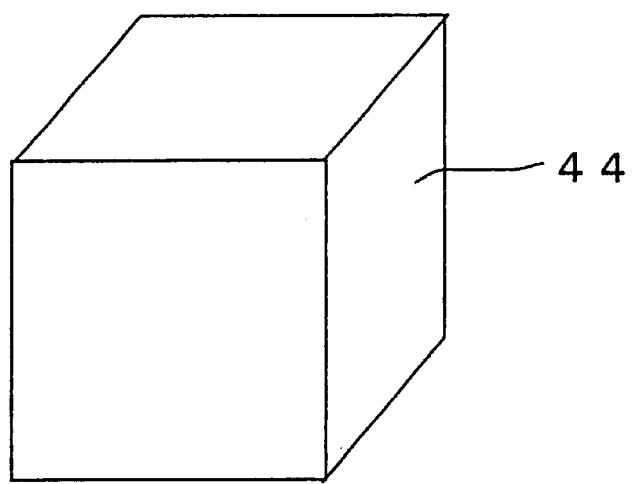

As illustrated in FIGS. 5 through 7, on an outer wall surface 21 of the second intake air passage 2, there is projected an arm 41, which is fixed to the supporting shaft 40' of the valve 40. An opposite end of the arm 41 swings together with the swinging of the valve 40. Further, one of the opposite ends of a coiled spring 5 is held by a projection 24, which is disposed on the outer wall surface 21 of the second intake air passage 2. The other opposite end of the coiled spring 5 is engaged with a semi-sphere-shaped sliding member 50, which is made from POM, and is brought into contact with the arm 41. In the state where the valve 40 closes the second intake air passage 2 as illustrated in FIG. 3, the coiled spring 5 is arranged so that a repulsion force resulting from the compression is stored therein. Accordingly, the sliding member 50 is pressed by the spring force of the coiled spring 5 in a direction of the arrow "D" of FIG. 5. Then, the valve 40 is pressed by the step 20 so as to close the second intake air passage 2. Moreover, as illustrated in FIG. 5, the arm 41 and the tailed spring 5 is enclosed by a cover 44, which is made from a resin. Note that FIGS. 3 and 4 are illustrated so as to take off a part of the cover 44.

Figure 8:
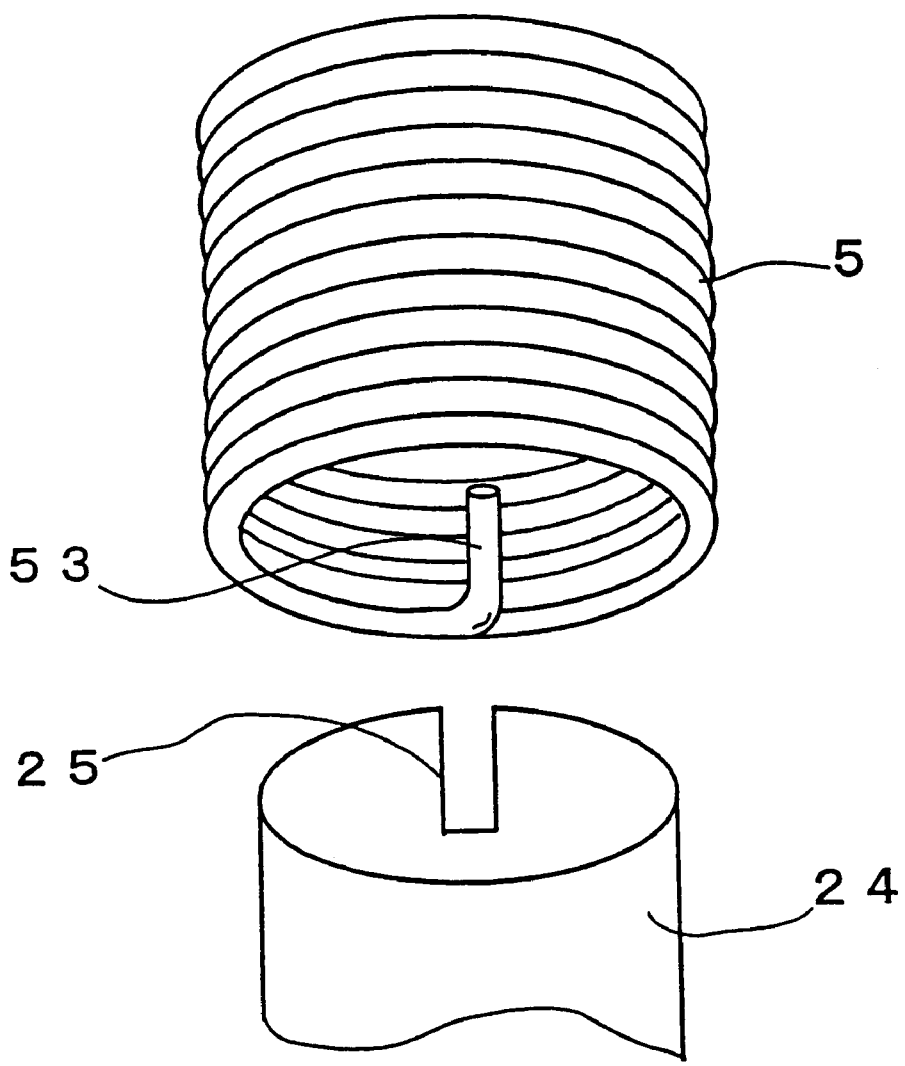
FIG. 8 is a perspective view for illustrating an assembly arrangement of a coiled spring of Example No. 1 of the present air duct.

As illustrated in FIG. 8, at the fixed opposite end of the coiled spring 5, a wire end 53 is bent down in a radial direction, and extends in a radial direction. Moreover, a slit 25 is formed in the projection 24, which is disposed on the outer surface of the second intake air passage 2. The projection 24 is fitted into the coiled spring 5 while the wire end 53 engages with the slit 25.

In the thus constructed Example No. 1 of the present intake air duct, when the inlet air negative pressure inside the second intake air passage 2 is smaller than a predetermined value, and when the first urging force acting onto the coiled spring 5 front the arm 41 is smaller than the second urging force stored in the coiled spring 5 by the compression, the arm 41 is pressed by the difference force between the first urging force and the second urging force in the direction of the arrow "D" of FIG. 5, and the second intake air passage 2 is closed by the valve 40 as illustrated in FIG. 5. At this moment, the sliding member 50 of the coiled spring 5 is brought into contact with a portion of the arm 41, portion which is adjacent to the swinging end of the arm 41.

Then, while the second urging force, which acts onto a contact point at which the sliding member 50 is brought into contact with the arm 41, is larger than the first urging force, the valve 40 is inhibited from swinging, because the arm 41 is pressed by the coiled spring 5 in the direction of the arrow "D" of FIG. 5. Accordingly, the second intake air passage 2 is kept to be closed. Thus, the intake air is taken in only through the first intake air passage 1 having a minor diameter. Hence, the acoustic mass is enlarged so that the intake air noises of low frequencies are reduced without using a resonator, etc. Moreover, the valve 40 is inhibited from flapping, because the leading end of the valve 40 is pressed onto the step 20.

When the intake air negative pressure is enlarged, the second urging force enlarges, because the arm 41 tries to swing in the direction opposite to the direction of the arrow "D" of FIG. 5, and because it further presses the coiled spring 5 in the central axis direction. Then, when the intake air negative pressure is further enlarged so that the first urging force is larger than the second urging force, the arm 41 starts swinging at last in the direction opposite to the direction of the arrow "D" of FIG. 5. Namely, until the intake air negative pressure enlarges to a certain extent, the swinging of the valve 40 is inhibited by way of the arm 41 by the urging force of the coiled spring 5 which is acted onto the arm 41. Accordingly, it is possible to effectively inhibit the noises during the low engine revolving speeds, and to suppress the flapping of the valve 40.

Then, when the first urging force is larger than the second urging force so that the arm 41 swings in the direction opposite to the direction of the arrow "D" of FIG. 5, the sliding member 50 moves on a surface of the arm 41 while sliding thereon. Thus, the compression of the coiled spring 5 enlarges gradually in the central axial direction to the maximum value, and thereafter reduces contrarily. Whilst, the coiled spring 5 is pressed by the arm 41 to cause the bending deformation. The repulsion force resulting from the bending deformation is smaller than the repulsion force resulting from the compression in the central axis direction. Accordingly, as illustrated in FIG. 6, the valve 40 swings at a stroke to open the second intake air passage 2, because the second urging force generating in the coiled spring 5 decreases after it reaches the maximum value. Thus, when the first urging force is maintained to be larger than the second urging force, which results from the deformation of the coiled spring 5, the valve 40 is kept so as to open the second intake air passage 2.

Therefore, the disadvantage, which results in the decreasing amount of the intake air, is avoided, because the intake air is taken in mainly through the thick short second intake air passage 2. Moreover, the intake air noises are mixed with the engine noises. Consequently, the intake air noises cannot be heard, and do not become the irritating noises.

Then, when the intake air negative pressure decreases so that the second urging force is larger than the first urging force, the arm 41 is bent down in the direction of the arrow "D" of FIG. 5 by the coiled spring 5. Hence, the valve 40 swings readily, and the second intake air passage 2 is closed as illustrated in FIG. 5.

Namely, in this example of the intake air duct according to the present invention, the valve 40 can be maintained automatically in the fully opened state or in the fully closed state, depending on the intake air negative pressure. It is possible to simultaneously reduce the intake air noises and secure the required intake air amount without using a resonator, etc. Moreover, the present intake air duct is highly reliable, and can he manufactured at reduced costs, because the present intake air duct has such a simple arrangement that the electronic control and the diaphragm actuator, etc., are obviated.

For instance, the coiled spring 5 is inhibited from rotating, because the coiled spring 5 is engaged with and fixed in the slit 25 at one of the opposite ends of the wire end 53. With this arrangement, the second urging force, which sets onto the arm 41 by the positional displacement of the wire end 53, is inhibited from fluctuating. As a result, the operations can be stabilized, and the performance is inhibited from fluctuating.

Further, when assembling the coiled spring 5, the projection 24 cannot be fitted into the coiled spring 5 as far as the wire end 53 engages with the slit 25. Therefore, in the manufacture of this example of the present intake air duct, it is possible to prevent the false operation, such as assembling the coiled spring 5 in wrong directions, from happening. Hence, the coiled spring 5 can be securely assembled in such a state that the coiled spring 5 is positioned accurately.

Furthermore, the coiled spring 5 contacts slidably with the arm 41 way of the sliding member 50. Accordingly, the coiled spring 5 exhibits a small friction resistance, and moves smoothly. Moreover, the arm 41 and the coiled spring 5 are disposed outside the second intake air passage 2, and is protected by the cover 44. Consequently, the water and the dust can be inhibited from depositing on the sliding surface, and the accuracy of the operations can be inhibited from degrading. In addition, it is possible to adjust the magnitude of the second urging force by simply adjusting the number of windings or the winding density of the coiled spring 5. Accordingly, compared with leaf springs, it is easy to tune the second urging force.

Example No. 2

Figure 9:
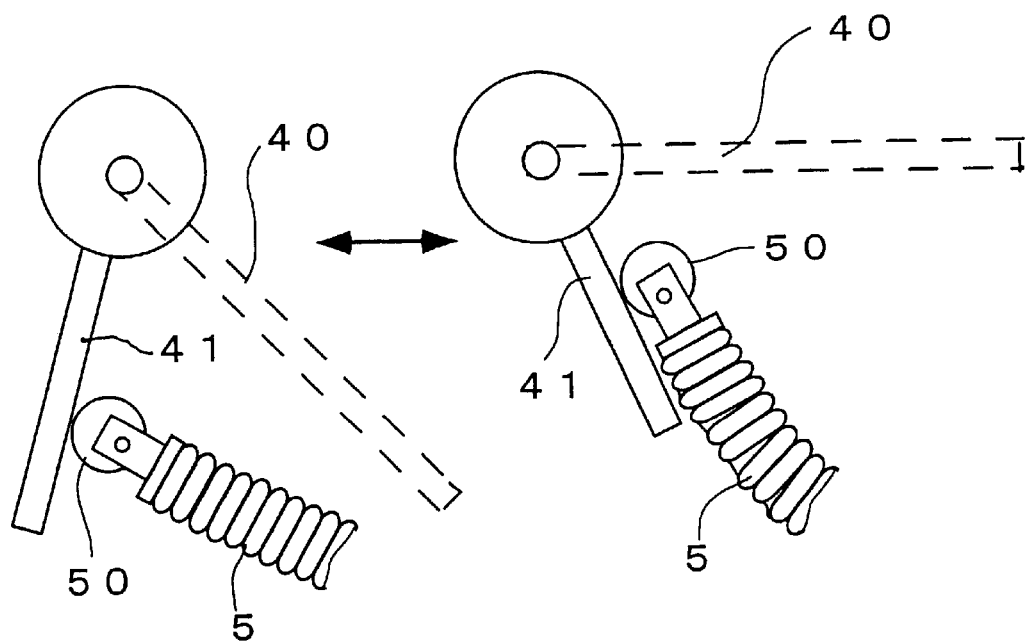
FIG. 9 is an explanatory diagram for illustrating Example No. 2 of an intake air duct according to the present invention, in which its valve is opened, and in which its valve is closed.

In FIG. 9, there is illustrated a major portion of this example of the present intake air duct. Except that the arrangement of the sliding member 50, which is disposed at the leading end of the coiled spring 5, is different from that of Example No. 1, and except that the construction of the valve 40 is different from that of Example No. 1, this intake air duct is arranged in the same manner as Example No. 1.

The sliding member 50 includes a rotatable rotor, and is fastened rotatably at the leading end of the coiled spring 5. Accordingly, in this intake air duct, the sliding member 50 rotates as the arm 41 moves. Hence, the coiled spring 5 can move remarkably smoothly.

Figure 10:
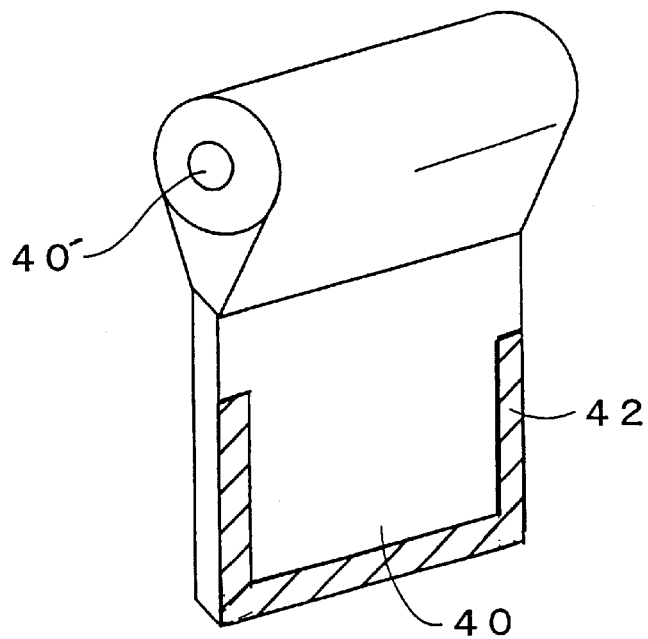
FIG. 10 is a perspective view for illustrating a valve, which is used in Example No. 2 of the present intake air duct.

Moreover, as illustrated in FIG. 10, the valve 40 is formed so that the joint between the supporting shaft 40' and the valve 40 has a heavy thickness. A cushioning member 42 is bonded on the outer rim of the valve 40. Accordingly, the strength of the valve 40 is improved. Moreover, when the valve 40 closes the second intake air passage 2, the cushioning member 42 is arranged so that it contacts with the step 20, which is disposed in the second intake air passage 2. As a result, not only the hitting noises are reduced, but also the sealing property is enhanced.

Example No. 3

Figure 11:
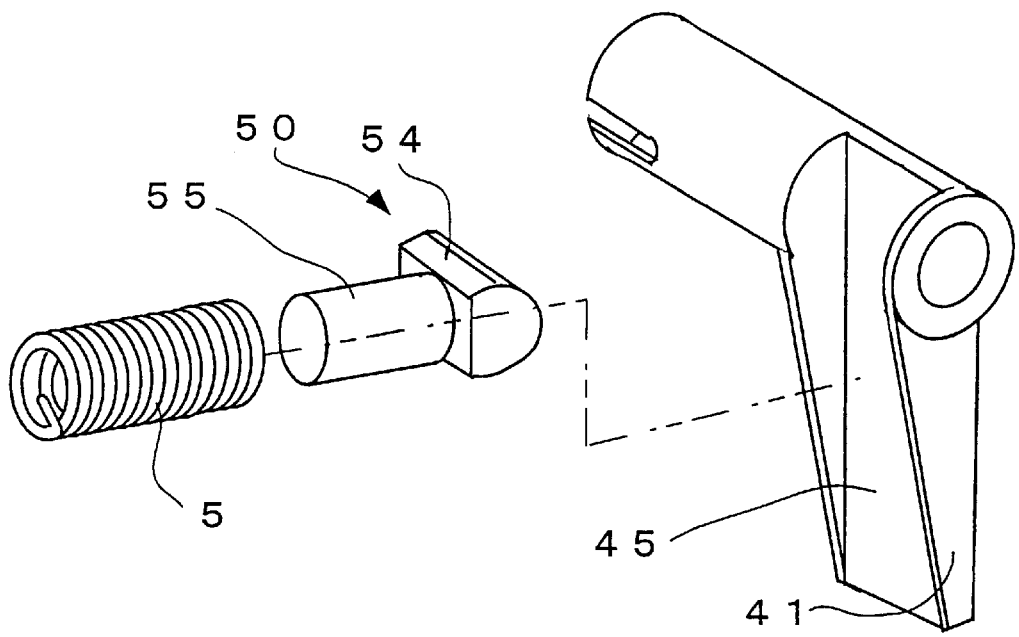
FIG. 11 is a perspective view for illustrating an actuating unit, which is used in Example No. 3 of an intake air duct according to the present invention.

Except that the shapes of the arm 41 and the sliding member 50 are different from those of Example No. 1, the, intake air duct of this example is arranged in the same manner as Example No. 1. As illustrated in FIG. 11, a guide groove 45 is formed in the arm 41. Moreover, the sliding member 50 includes a semi-eclipse-shaped head member 54 and a shaft member 55. The shaft member 55 is fitted into the leading end of the coiled spring 5. Thus, the head member 54 is arranged so that it is guided by the guide groove 45, and so that it is slid linearly.

Namely, the intake air duct of this example operates and effects advantages in the same manner as the above-described respective examples. The sliding member 50 is guided by the guide groove 45 so that it slides linearly therein. In addition, the coiled spring 5 is securely deformed in a predetermined direction only, because the wire end 53 of one of the opposite ends of the coiled spring 5 is fastened to the slit 25. Thus, it is possible to stably operate this example of the present intake air duct securely.

Example No. 4

By the way, in Example No. 3 of the present intake air duct, the head member 54 of the sliding member 50 engages with the guide groove 45, and the opposite side surfaces of the head member 54 are formed as a flat surface. Moreover, the shaft member 55 of the sliding member 50 is fitted into the other opposite end of the coiled spring 5, and the shaft member 55 is rotatable with respect to the coiled spring 5. Accordingly, when the sliding member 50 rotates while the head member 54 is engaged with the guide groove 45, the opposite side surfaces of the sliding member 50 may interfere with the inner opposite side surfaces of the guide groove 45. As a result, there may arise a case where the resistance in the sliding may enlarge so that this example of the present intake air duct may operate unstably.

Figure 12:
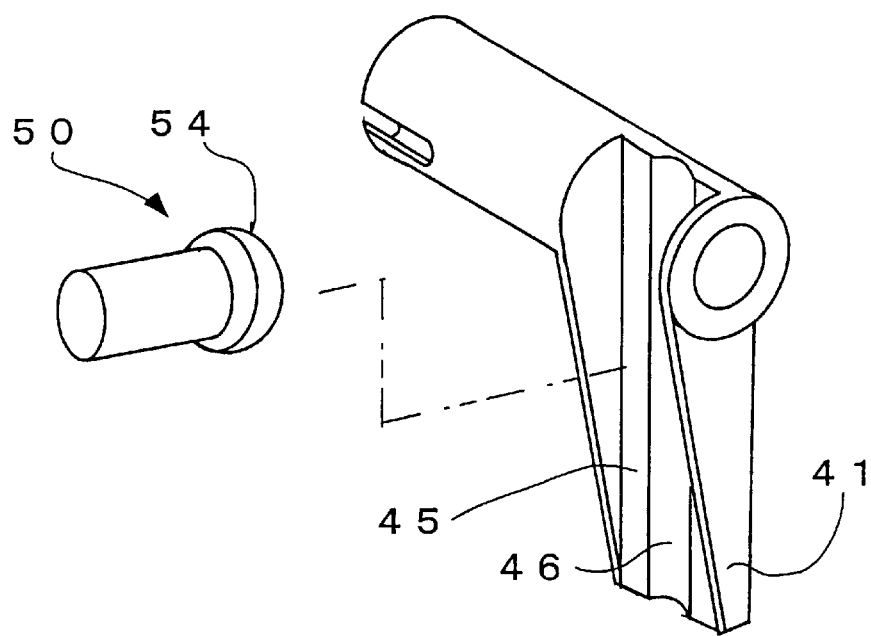
FIG. 12 is a perspective view for illustrating an actuating unit, which is used in Example No. 4 of an intake air duct according to the present invention.

Hence, in this example, as illustrated in FIG. 12, the head member 54 of the sliding member 50 is formed as a semi-sphere shape, and a second guide groove 46 is further formed as an arc shape in the cross section in the guide groove 45 of the arm 41. The other arrangements are the came as those of Example No. 3. With these arrangements, the head member 54 of the sliding member 50 is guided by the second guide groove 46. Since the head member 54 is formed as a semi-sphere shape, and since the second guide groove 46 is formed as an arc in the cross section, it is possible to maintain the contacting area between the second guide groove 46 and the head member 54 substantially constant even when the sliding member 50 rotates, and the interference does not occur. As a result, it is possible to make the resistance constant in the sliding operation. Compared with Example No. 3 of the present intake air duct, the operations are further stabilized in the present intake air duct of Example No. 4.

Having now fully described the present invention, it will be apparent to one of ordinary skill in the art that many changes and modifications can be made thereto without departing from the spirit or scope of the present invention as set forth herein including the appended claims.

What is claimed is:

1. An intake air duct serving as a passage for supplying air to an engine, the intake air duct comprising:
   a first intake air passage;
   a second intake air passage;
   an opening-and-closing valve swingably disposed in said second intake air passage so as to open and close said second intake air passage;

an interlocking member swingably disposed outside said first intake air passage and said second intake air passage such that swinging of the opening-and-closing valve results in the swinging of the interlocking member; and a coiled spring disposed swingably outside said first intake air passage and said second intake air passage, and having a swinging end brought into contact with a surface of said interlocking member, the swinging end sliding on a surface of said interlocking member during the swinging of said interlocking member;

said second intake air passage being opened by said opening-and-closing valve when a first urging force, which acts onto said coiled spring, is larger than a second urging force, which is exerted by a spring elasticity of said coiled spring, and being closed when the first urging force is smaller than the second urging force, and/said first urging force results from a negative pressure exerted in said second intake air passage applied to the opening-and-closing valve causing said opening-and-closing valve swinging in the opening direction, and further causing the swinging of the interlocking member.

2. The intake air duct according to claim 1, wherein said coiled spring has a wire end opposite the swinging end, the wire end extending inwardly within the coiled spring, the wire end being secured outside the second air intake passage.

3. The intake air duct according to claim 1, wherein at least one of a leading end, of said coiled spring surface of said interlocking member, on which said coiled spring slides, has a sliding member, which exhibits a small friction resistance.

4. The intake duct according to claim 1, further comprising a cover which covers said interlocking member and said coiled spring.

5. The intake air duct according to claim 1, wherein said interlocking member has a guide groove which guides said coiled spring swinging end.

6. The air intake duct according to claim 5, wherein said coiled spring has a sliding member having a substantially semi-spherical shape, and said guide groove has a second guide groove having a cross-section arcuate shape.

7. The intake air duct according to claim 1, wherein said opening-and-closing valve has a cushioning member which contacts with a step disposed in said second intake air passage.

* * * * *